United States Patent [19]

Osumi

[11] Patent Number: 5,678,782

[45] Date of Patent: Oct. 21, 1997

[54] RETRACTOR HAVING A CLAMP

[75] Inventor: Sadanori Osumi, Kanagawa, Japan

[73] Assignee: NSK Ltd., Japan

[21] Appl. No.: 572,103

[22] Filed: Dec. 14, 1995

[30] Foreign Application Priority Data

Dec. 27, 1994 [JP] Japan ................... 6-337016

[51] Int. Cl.⁶ ........................... B60R 22/28; B60R 22/42
[52] U.S. Cl. ......................... 242/381.1; 242/379.1
[58] Field of Search ..................... 242/381.1, 381.4, 242/379.1; 280/806; 297/478, 480

[56] References Cited

U.S. PATENT DOCUMENTS

| | | |
|---|---|---|
| 4,422,593 | 12/1983 | Takada . |
| 4,949,995 | 8/1990 | Haland et al. . |
| 5,154,368 | 10/1992 | Fujimura et al. . |
| 5,174,604 | 12/1992 | Numazawa et al. . |
| 5,242,213 | 9/1993 | Föhl . |
| 5,299,854 | 4/1994 | Fujimura et al. . |
| 5,344,096 | 9/1994 | Frei et al. .................. 242/381.1 |
| 5,460,338 | 10/1995 | Hirata et al. ............... 242/381.1 |
| 5,524,842 | 6/1996 | Ogawa et al. .............. 242/381.1 |

FOREIGN PATENT DOCUMENTS

| | | |
|---|---|---|
| 4-43550 | 4/1992 | Japan . |
| 4-43551 | 4/1992 | Japan . |
| 4-62255 | 5/1992 | Japan . |
| 4-252761 | 9/1992 | Japan . |
| 4-266553 | 9/1992 | Japan . |

*Primary Examiner*—John M. Jillions
*Attorney, Agent, or Firm*—Evenson, McKeown, Edwards & Lenahan P.L.L.C.

[57] ABSTRACT

A retractor having a clamp is provided for use in a seat belt system. The retractor comprises a base, a take-up spindle rotatably supported on the base, a webbing wound on the take-up spindle, a clamp movement limiting member, a holding mechanism for holding the clamp movement limiting member on a base via a plastically deformable member, the clamp movable between a first position where the clamp holds the webbing between itself and the clamp movement limiting member and a second position wherein the clamp permits free passing of the webbing, a transmitting member for bringing the clamp from the second position to the first position in response to rotation of the take-up spindle in a webbing releasing direction, and a connecting member for releasably connecting the transmitting member to the take-up spindle. When the clamp is brought to the first position by the transmitting member and a pulling force of at least a predetermined value is then applied to the webbing, the plastically deformable member undergoes deformation while maintaining a webbing clamping force, thereby permitting movement of the clamp movement limiting member in the webbing releasing direction.

16 Claims, 11 Drawing Sheets

RETRACTOR HAVING A CLAMP

BACKGROUND OF THE INVENTION a) Field of the Invention

This invention relates to a retractor for a seat belt system, and especially to an improvement in a retractor having a clamp, said retractor being provided with a clamping mechanism for directly clamping a webbing in the event of a vehicular emergency so that a length of the webbing to be wound out can be minimized.

b) Description of the Related Art

Seat belt systems have conventionally been used to restrain an occupant of a vehicle or the like in a seat so that the occupant can be protected from an impact of a collision. Retractors employed in such seat belt systems include those provided not only with an emergency locking mechanism for locking rotation of a take-up spindle, on and around which a webbing is wound, in a webbing releasing direction but also with a clamping mechanism for directly clamping the webbing to prevent its outward extension in the event of a vehicular emergency such as a collision.

It is however expected that in the event of a vehicular emergency such as a collision, the webbing clamped by the above-described clamping mechanism may be exposed to a force equal to or greater than its breaking strength. If a retractor with a webbing prevented from extension by such a clamping mechanism as described above is applied with such a strong pulling force as causing further extension of the webbing, a force may be intensively applied to a webbing clamping portion to more strongly clamp the webbing. Further, when the force of an impact by a collision is extremely high, an abrupt deceleration is applied to the body of the occupant and as a result, a load on the occupant by the webbing may become greater.

In addition to a type of clamping mechanism in which a turnable clamping member turnably supported at an end thereof on a retractor base clamps a webbing to prevent extension of the webbing as described above, there is also a type of clamping mechanism in which a wedge-shaped clamping member penetrates between a sliding contact surface of a guide member fixed on a retractor base and a rear wall of a retractor base to clamp a webbing so that the webbing is prevented from extending out. Due to differences in components, various declamping mechanisms such as those mentioned above cannot however be applied to the latter clamping member.

As declamping mechanisms applicable to a clamping mechanism making use of such a wedge-shaped clamping member, there are declamping mechanisms disclosed, for example, in Japanese Patent Application Laid-Open (Kokai) No. HEI 4-266553 and Japanese Utility Model Application Laid-Open (Kokai) No. HEI 4-43551.

According to the declamping mechanism of the above-described Japanese Patent Application Laid-Open (Kokai) No. HEI 4-266553, a webbing retractor and a webbing clamping mechanism are connected to each other via connecting means which, at the same time as a pulling force to a webbing reaches a predetermined value, undergoes plastic deformation to permit limited movement of the webbing clamping means in a direction away from the retractor. Upon application of a pulling force of at least a predetermined load value to the webbing clamping means via the webbing, the connecting means is broken so that the holding of the webbing by the webbing clamping means is released.

In the declamping mechanism disclosed in the above-described Japanese Utility Model Application Laid-Open (Kokai) No. 4-43551, a clamping portion (toothed portion) arranged on a surface of clamping means, said surface facing a webbing, is designed to be shorn by a pulling force applied to the webbing. When a pulling force of at least a predetermined value is applied to the webbing, the clamping portion is shorn so that holding of the webbing by the clamping means is released.

Further, Japanese Utility Model Application Laid-Open (Kokai) No. HEI 4-62255 discloses an energy absorbing mechanism making use of plastic deformation. A folded back portion of a U-shaped bent plate is caused to shift through plastic deformation, whereby energy is absorbed.

According to the retractor provided with the declamping mechanism of the above-described Japanese Patent Application Laid-Open (Kokai) No. HEI 4-266553, however, application of a pulling force of at least the predetermined value to the webbing clamping means via the webbing causes the connecting means to break so that the webbing clamping means moves in a direction away from the webbing retractor. In the retractor provided with the declamping mechanism of the above-described Japanese Utility Model Application Laid-Open (Kokai) No. HEI 4-43551, on the other hand, application of a pulling force of at least the predetermined value to the clamping means via the webbing causes the clamping portion to shear so that the webbing holding force is lost at once.

In these declamping mechanisms, tightening of the webbing wound on and around the take-up spindle takes place concurrently with the elimination of the webbing clamping force so that subsequent to the declamping, the webbing suddenly extends out. As a consequence, the pulling force acting on the webbing suddenly decreases once and due to locking of rotation of the take-up spindle in the webbing releasing direction by an emergency locking mechanism, may then abruptly increase in some instances.

These declamping mechanisms are therefore accompanied by the potential problem that upon restraint of an occupant at the time of a vehicular collision, the absorbability of energy immediately after declamping is reduced and the re-increase of load subsequent to a load reduction is increased, thereby making the gradient of its rise steep. As a result, it becomes difficult to fully absorb kinetic energy of the occupant, leading to difficulty in effectively reducing an impact to be applied to the occupant.

Further, incorporation of the energy absorbing mechanism of the above-described Japanese Utility Model Application Laid-Open (Kokai) No. HEI 4-62255 in a retractor requires formation of the folded back portion of the U-shaped bent plate in a lower stay downwardly extending from a base of the retractor and also fixing of a retractor main body on a vehicle body via a casing fixed on a vehicle body panel. If a pulling force of at least a predetermined value is applied to the retractor via the webbing, the above-described folded back portion undergoes plastic deformation, resulting in the problems that the retractor main body moves upwardly and fixing of the retractor on the vehicle body by an upper stay upwardly extending from the base of the retractor becomes difficult, that is, the mountability of the retractor on the vehicle is deteriorated. Further, the retractor main body fixed on the vehicle body panel by the lower stay alone is considered to have a tendency to unnecessarily produce extra vibrations.

SUMMARY OF THE INVENTION

An object of the present invention is therefore to overcome the above-described problems and to provide a retractor having a clamp, said retractor having good on-vehicle mountability and being provided with an improved clamping mechanism which can efficiently absorb kinetic energy developed on the body of an occupant upon collision of a vehicle.

The above object of the present invention can be achieved by a retractor having a clamp, comprising:

a base, a take-up spindle rotatably supported on said base, a webbing wound on said take-up spindle, a clamp movement limiting member, a holding mechanism for holding said clamp movement limiting member on a base via a plastically deformable member, a clamp movable between a first position where said clamp holds said webbing between itself and said clamp movement limiting member and a second position wherein said clamp permits free passing of said webbing, a transmitting member for bringing said clamp from said second position to said first position in response to rotation of said take-up spindle in a webbing releasing direction, and a connecting member for releasably connecting said transmitting member to said take-up spindle;

wherein when said clamp is brought to said first position by said transmitting member and a pulling force of at least a predetermined value is then applied to said webbing, said plastically deformable member undergoes deformation while maintaining a webbing clamping force, thereby permitting movement of said clamp movement limiting member in said webbing releasing direction.

The holding mechanism may preferably comprise the plastically deformable member arranged on the base and a holding member arranged on the clamp movement limiting member and holding the plastically deformable member. The plastically deformable member may comprise a bent portion of a predetermined shape, and the holding member may hold the bent portion. The plastically deformable member may be a part of the base, and the clamp movement limiting member may have a holding member of a complementary shape with the bent portion. Desirably, the bent portion of the plastically deformable member may be bent in a substantially semi-circular shape in cross-section, and the clamp movement limiting member may comprise a groove of a complementary shape with the bent portion and a pin arranged on a concaved side of the bent portion. With movement of the clamping member in the webbing releasing direction, the holding bent portion of the plastically deformable member is caused to progressively undergo plastic deformation by the holding member of the clamp movement limiting member, so that the clamp movement limiting member is allowed to move in the webbing releasing direction while maintaining a webbing clamping force of the clamp.

As an alternative, the holding mechanism may preferably comprise the plastically deformable member arranged on the clamp movement limiting member and a holding member arranged on the base and holding the plastically deformable member. The plastically deformable member may comprise a bent portion of a predetermined shape, and the holding member may hold the bent portion. Desirably, the plastically deformable member may be an elongated member attached to the clamp movement limiting member and the base may have a holding member maintained in engagement with the bent portion. Specifically, the holding member may comprise a first pin arranged in a convex portion of the bent portion and a second and third pins located on a convex side of the bent portion and arranged on opposite sides of the first pin relative to a longitudinal direction of the plastically deformable member. With movement of the clamping member in the webbing releasing direction, the holding bent portion of the plastically deformable member is caused to progressively undergo plastic deformation by the holding member of the retractor base, so that the clamp movement limiting member is allowed to move in the webbing releasing direction while maintaining a webbing clamping force of the clamp.

According to the above-described construction of the present invention, application of a pulling force of at least the predetermined value to the webbing in a clamped state as a result of actuation of an emergency locking mechanism also leads to application of a load of at least a predetermined value to the clamp movement limiting member via the clamp by which the webbing is held. With movement of the clamp in the webbing releasing direction, the clamp movement limiting member moves together with the clamp in the webbing releasing direction while causing the holding mechanism to undergo plastic deformation.

Owing to the movement of the clamp movement limiting member together with the clamp in the webbing releasing direction, the clamp movement limiting member, even after the webbing has extended out from the retractor, is allowed to move in the webbing releasing direction while causing the holding mechanism, which restricts movement of the clamp movement limiting member, to undergo plastic deformation. Concurrently with this, the webbing which is wound on and around the take-up spindle is tightened up.

By resistance of the holding mechanism to the deformation and resistance of the webbing to the tightening, kinetic energy of the occupant is effectively consumed and in addition, an abrupt drop in the pulling force to the webbing upon declamping such as that observed in the conventional examples can be prevented. The webbing is therefore pulled out of the retractor at a constant pulling force.

Namely, the prevention of an abrupt drop in a pulling force to the webbing after declamping can improve the absorbability of kinetic energy of an occupant in an initial stage of a collision and can also suppress a re-increase in load subsequent to a drop in load, so that an impact to the occupant can be effectively reduced.

Since the holding mechanism undergoes plastic deformation to permit movement of the clamp movement limiting member together with the clamp in the webbing releasing direction, it is unnecessary to movably fix the retractor main body on the vehicle body so that the base of the retractor can be firmly fixed on the vehicle panel and the on-vehicle mountability of the retractor is improved.

The present invention can therefore provide a retractor having a clamp, which has good on-vehicle mountability and is provided with a good clamping mechanism permitting efficient absorption of kinetic energy to be produced on the body of an occupant upon vehicular collision or the like.

DETAILED DESCRIPTION OF THE INVENTION AND PREFERRED EMBODIMENTS

Based on FIGS. 1 to 7 of the accompanying drawings, the first embodiment of the present invention will hereinafter be described.

Figure 1:
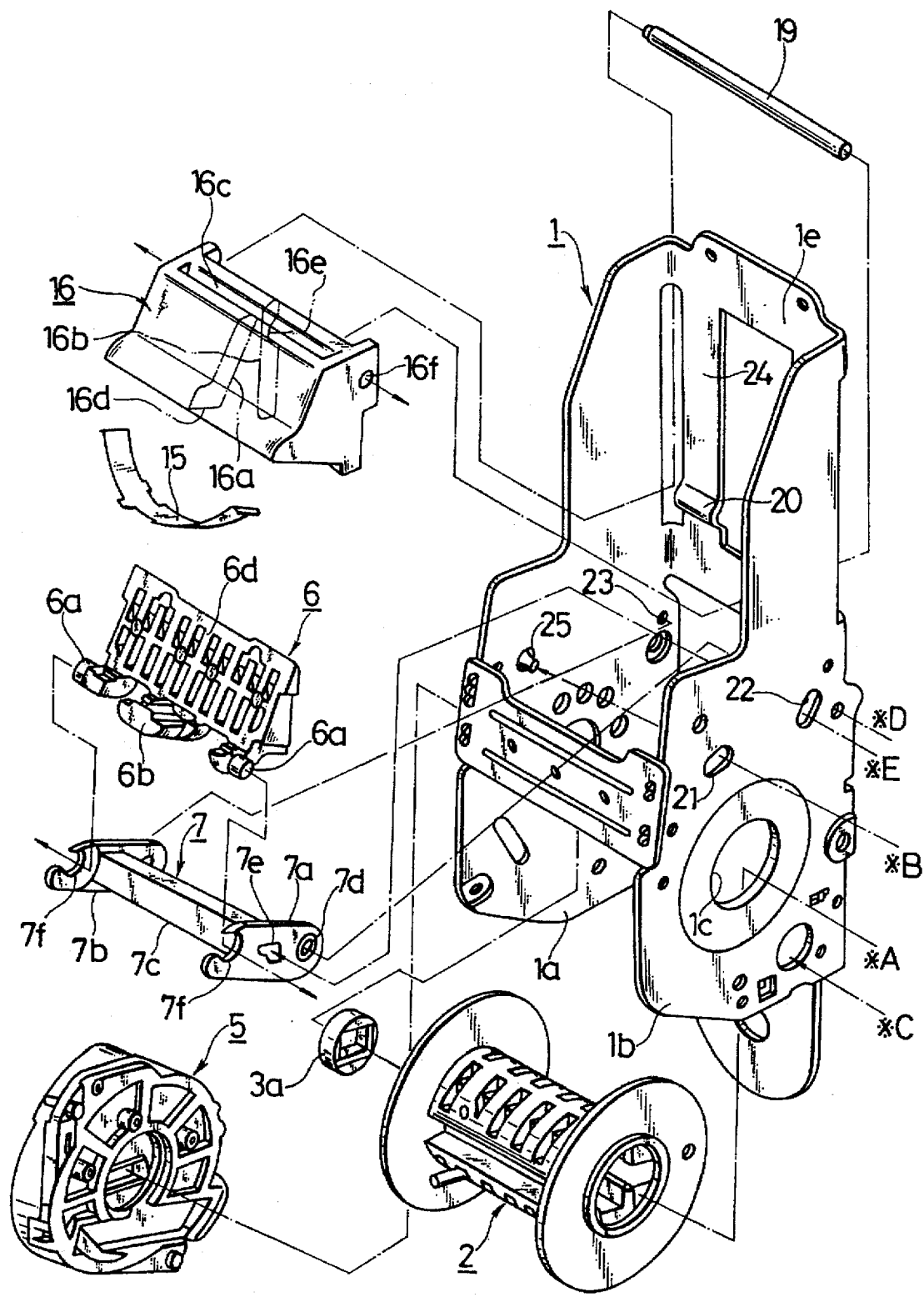
FIG. 1 is a part of an exploded perspective view of a retractor having a clamp, which retractor pertains to a first embodiment of the present invention.
Figure 2:
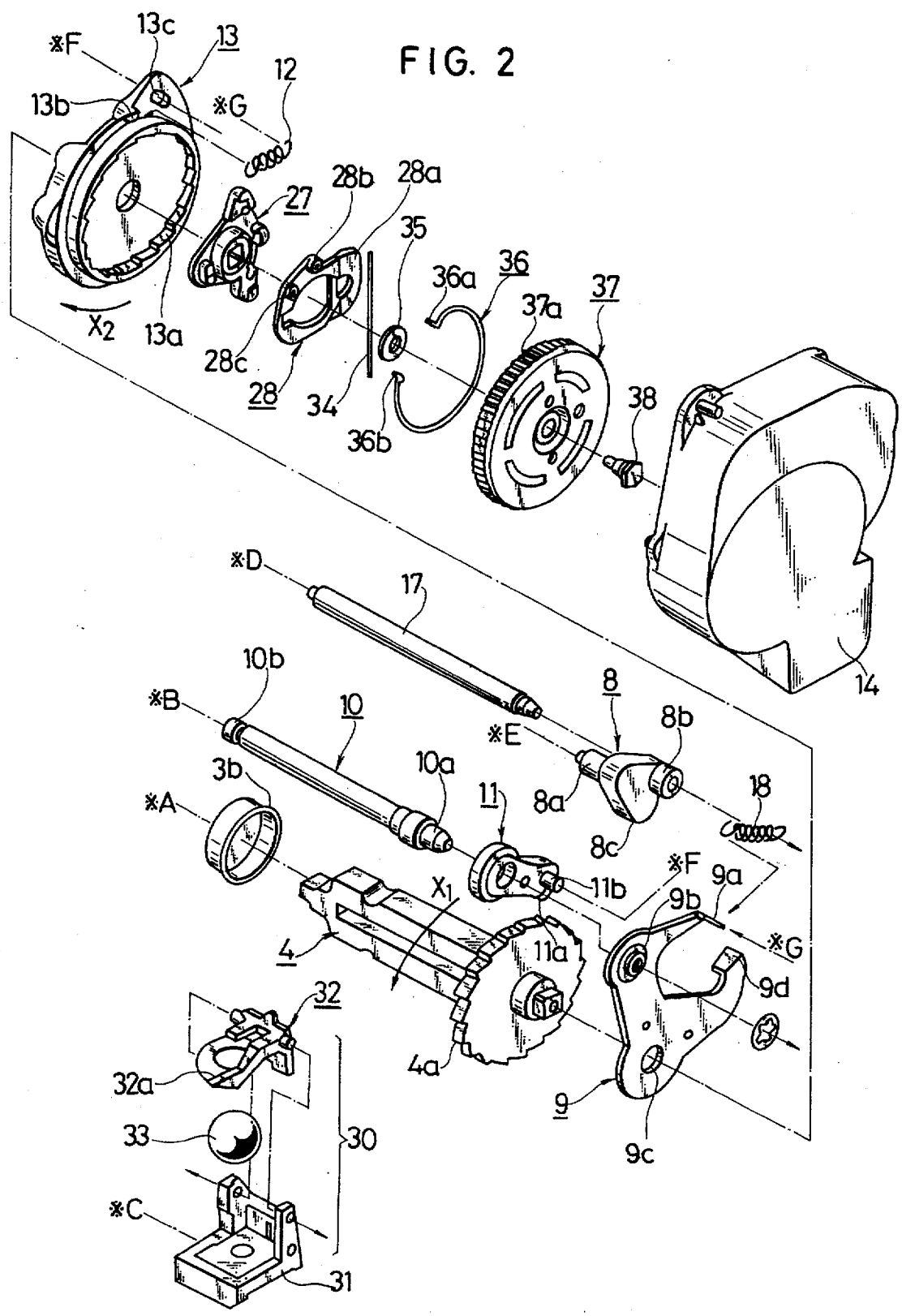
FIG. 2 is the remaining part of the exploded perspective view of the retractor shown in FIG. 1.

In the exploded perspective view of the retractor according to the first embodiment of the present invention illustrated in FIGS. 1 and 2, a base 1 has a turned square U-shaped cross-section in a majority thereof, through-holes 1c are formed in an opposed relationship in mutually-opposing side walls 1a,1b of the base 1, and a take-up spindle 4 is rotatably supported between the through-holes 1c. The take-up spindle 4 is fixedly provided with a bobbin 2 on and around which a webbing is wound. Preferably, the bobbin 2 is made of a synthetic resin or aluminum. On one end of the take-up spindle 4, a known winding spring unit 5 is disposed so that the take-up spindle 4 is normally biased in a direction in which the webbing is wound in.

On an opposite end of the take-up spindle 4, on the other hand, an emergency locking mechanism is arranged to prevent release of the webbing in the event of an emergency. This emergency locking mechanism has a latch plate 4a, which is a ratchet wheel and is fixedly mounted on the opposite end of the take-up spindle 4. An end portion of the take-up spindle 4 extends out through the latch plate 4a. Loosely fitted on the outwardly extending end portion of the take-up spindle 4 are a tension plate 9, which defines a through-hole 9c therein, and a latch cup 13 which is a ratchet member and is provided with internal teeth 13a. Further, a return spring 12 is mounted between a spring hanger 13b formed on the latch cup 13 and a spring hanger 9a formed on the tension plate 9, whereby the latch cup 13 is applied with a biasing force in a direction indicated by arrow $X_2$. In addition, on the outwardly extending portion of the take-up spindle 4, said portion being located outside the latch cup 13, a flange 27, a lock member 28, a plane washer 35 and a cup-shaped inertia member 37 are arranged. A self-tapping screw 38 is threaded in the take-up spindle 4 from an outside of the inertia member 37 so that these members are secured on the take-up spindle 4. The lock member 28 is provided with an engaging portion 28a which is engageable with the internal teeth 13a of the latch cup 13. The lock member 28 is normally biased by a sensor spring 34 so that the engaging portion 28a remains out of engagement with the internal teeth 13a. A friction spring 36 is internally in frictional engagement with the inertia member 37. Inwardly-extending end portions 36a,36b of the friction spring 36 are received in engaged holes 28b,28c of the lock member 28, respectively. When the engaging portion 28a of the lock member 28 is brought into engagement with one of the internal teeth 13a of the latch cup 13 in the event of an emergency such as a vehicular collision, rotation of the take-up spindle 4 is transmitted to the latch cup 13 so that the latch cup 13 is turned in the direction of arrow $X_1$ against the biasing force of the return spring 12.

Further, a pawl 11 which prevents rotation of the latch plate 4a in a webbing releasing direction (the direction of arrow $X_1$) when bought into engagement with the latch plate 4a is turnably supported via a pawl pin 10 outside the side wall 1b of the base 1 so that the pawl 11 can be engaged with or disengaged from the latch plate 4a. The pawl pin 10 extends through a through-hole 25 and a slot 21 formed in the mutually-opposing side walls 1a,1b, respectively, so that the pawl pin 10 is mounted bridging the side walls 1a,1b. An outer end portion 10a is pivotal about a portion of said pawl pin 10 where said pawl pin 10 is in engagement with the through-hole 25.

On the outer end portion 10a of the pawl pin 10, the tension plate 9 is fitted at a through-hole 9b formed therein. The center of rocking motion of the pawl 11 is therefore displaceable along the slot 21. The pawl 11 is provided with a pawl guide pin 11b. This pawl guide pin 11b is inserted in a pawl guide slot 13c formed in an outer peripheral portion of the latch cup 13.

Fixedly arranged on a lower part of the side wall 1b of the base 1 is a sensor case 31 as a component of a vehicle body acceleration sensor 30. A spherical weight 33 is arranged as a sensor in a hollow space of the sensor case 31, and a sensor arm 32 having a finger-shaped stopper 32a is rockably mounted on the sensor case 31. Covering this emergency locking mechanism, a sensor cover 14 is arranged on an outer surface of the side wall 1b of the base 1.

Arranged in an inner upper part of the base 1, said inner upper part being covered by an unillustrated dust cover, is a clamping mechanism which prevents release of the webbing by directly clamping the webbing.

With additional reference to the fragmentary vertical cross-sectional view depicted in FIG. 3, the clamping mechanism will be described. The clamping mechanism comprises a clamp 6, a clamp movement limiting member 16, a plastically deformable member 24 and a guide slit 29. The clamp 6 is a wedge-shaped clamp member whose thickness decreases in the webbing releasing direction. The clamp 6 is provided with a clamping toothed portion 6c which can be brought into engagement with a webbing 26 to clamp the same. The clamp movement limiting member 16 defines a wedge-shaped opening 16c which can receive therein a tapered end portion of the clamp 6. The plastically deformable member 24 and the guide slit 29 make up a holding mechanism for limiting movement of the clamp movement limiting member 16 in the webbing pulling direction. The clamp movement limiting member 16 is made of a metal and is formed as an integral unit by casting, stamping, pressing or the like. The wedge-shaped opening 16c of the clamp movement limiting member 16 is defined by a sliding contact surface 16a, a pressure-receiving surface 16b, and surfaces located on opposite sides, respectively, as viewed in the direction of a width of the webbing. The sliding contact surface 16a undergoes a sliding contact with a flat surface 6d, which is one of two surfaces defining a wedge as the clamp 6, so that the clamp 6 is guided to a webbing-clamping engagement position. The pressure-receiving surface 16b is pressed by a webbing-facing surface, which is the other one of the surfaces defining the wedge as the clamp 6, with the webbing 26 clamped therebetween. The sliding contact surface 16a is formed at a predetermined inclination so that the sliding contact surface 16a is located, on an upper side thereof, close to the pressure-receiving surface 16b parallel to a rear wall 1e of the base 1.

On the other hand, the rear wall 1e of the base 1 is provided with a pair of strip-shaped, plastically deformable portions (plastically deformable members) 24 which have been press-formed and extend in the direction of a length of the webbing. At lower parts of the plastically deformable portions 24, holding bent portions 20 are formed by bending the lower parts into semicircular shapes in cross-section so that the holding bent portions 20 extend toward an interior of the retractor.

A rear wall (a wall facing the rear wall 1e of the base 1) of the clamp movement limiting member 16, said rear wall being located adjacent to the holding bent portions 20, is provided with the guide slit 29 formed in a cross-sectional shape complementary with a bent shape of the holding bent portions 20, forming one of the holding members constituting the holding mechanism. The guide slit 29 is formed by a groove 16e, which has a semicircular shape in cross-section and is formed as one of the holding members in the form of a recess in the rear wall of the clamp movement limiting member 16, and a pin 19 inserted as the other one of the holding members in holding holes 16f of the clamp movement limiting member 16.

Figure 3:
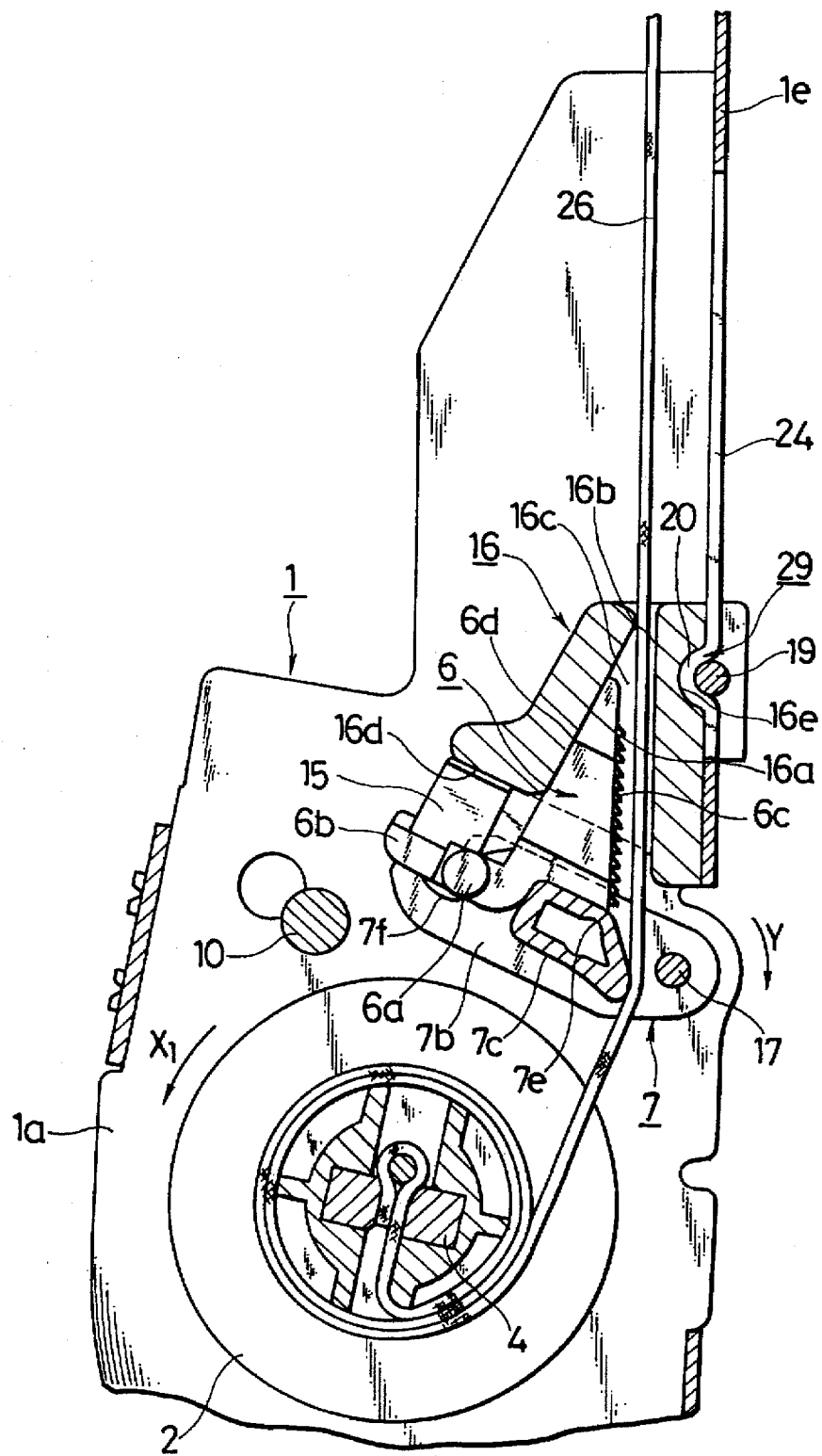
FIG. 3 is a fragmentary vertical cross-sectional view of a clamping mechanism in the retractor shown in FIG. 1, which is useful for the description of operation of the clamping mechanism.

The clamp movement limiting member 16, which is arranged on the rear wall 1e of the base i with the groove 16e being in engagement with the holding bent portions 20, is held on the base 1 by the pin 19 inserted in the holding hole 16f in such a state that the clamp movement limiting member 16 is limited in movement in the webbing releasing direction as illustrated in FIG. 3. In this state, the clamp movement limiting member 16 is, on a side where the pressure-receiving surface 16b is formed, in contact with the rear wall 1e of the base 1, so that a force applied from the clamp 6 in a direction toward the pressure-receiving surface 16b is received by the rear wall 1e of the base 1.

Because the toothed portion 6c of the clamp 6 positioned with the tapered end portion thereof located on the upper side and also with the flat surface 6d thereof maintained in face-to-face contact with the sliding contact surface 16a of the clamp movement limiting member 16 is always arranged in parallel with surfaces of the webbing 26 to be clamped, the clamp 6 arranged for sliding movement along the sliding contact surface 16a of the clamp movement limiting member 16 can be brought into engagement with the webbing 26 to evenly clamp the webbing 26. Further, a return spring 15 is disposed between an engaging portion 6b, which is arranged on a side of a lower end of the clamp 6 and extends out from the clamp 6, and a lower end surface 16d of the clamp movement limiting member 16, whereby the clamp 6 is biased in a direction in which the clamp 6 remains out of engagement with the webbing 26.

Arranged below the clamp 6 is a clamp lever 7 which limits movement of the clamp 6 biased by the return spring 15. In combination with the tension plate 9 and an outer plate cam 8 which is arranged on an outer side of the side plate 1b of the base 1 and maintained in engagement with the tension plate 9, the clamp lever 7 constitutes a transmitting member which serves to move the clamp 6 in a webbing clamping direction in response to rotation of the take-up spindle 4 in the webbing releasing direction.

The clamp lever 7 comprises a pair of plate-shaped members 7a,7b and a tie bar 7c extending between the plate-shaped members 7a,7b and maintained in contact with a lower end wall of the clamp 6. Notched portions 7f are formed in the plate-shaped members 7a,7b and are maintained in engagement with corresponding pivots 6a arranged extending from side walls of the clamp 6, respectively. Holes 7d are also formed in the plate-shaped members 7a,7b, respectively. Opposite to the holes 7d, through-holes 23 are formed in the side walls 1a,1b of the base 1, respectively. A lever pin 17 extends through the through-holes 23 and the clamp lever 7 is pivotally supported on the lever pin 17. The outer plate cam 8 defines therethrough a hole 8b. An end portion of the lever pin 17, said end portion extending out through the through-hole 23, extends through the hole 8b, so that the outer plate cam 8 is turnably supported along the side wall 1b. Further, outer plate cam 8 has an inner pin 8a and a contacting portion 8c. The inner pin 8a extends inwardly through a slot 22 in the side wall 1b of the base 1 and is in engagement with an engagement hole 7e of the plate-shaped member 7a. The contacting portion 8c, on the other hand, is in engagement with an engaged portion 9d formed in the tension plate 9.

As the lower end wall of the clamp 6 is maintained in contact with the tie bar 7c, the clamp lever 7 is limited in movement against the biasing force of the return spring 15. Namely, the pivots 6a of the clamp 6 are supported by the notched portions 7f formed on sides of free ends of the plate-shaped members 7a,7b, respectively, and the lower end wall of the clamp 6 is supported by the tie bar 7, so that the toothed portion 6c of the clamp 6 is maintained at a position where the toothed portion 6c is out of engagement with the webbing 26. When the outer plate cam 8 upwardly turns about the lever pin 17, the clamp lever 7 is also turned upwardly about the lever pin 17. In the course of this upward turning motion, the turning clamp lever 7 presses via the notched portions 7f the pivots 6a of the clamp 6 against the biasing force of the return spring 15 so that, while the flat surface 6d is caused to slide along the sliding contact surface 16a of the clamp movement limiting member 16, the clamp 6 is moved in the direction in which the clamp 6 is to be brought into engagement with the webbing 26. During this movement, the slot 22 remains out of interference with the inner pin 8a.

Further, a return spring 18 is held at one end thereon on the lever pin 17 and at an opposite end thereof on the spring hanger 9a of the tension plate 9 (see FIG. 2). The return spring 18 exerts a greater biasing force than the biasing force of the return spring 12. By the biasing force of the return spring 18, the tension plate 9 is biased in the direction of arrow $X_2$. The pawl pin 10 is thus biased in the webbing winding direction on a side of a rear edge 21a of the slot 21.

A description will next be made of operation of the retractor having the clamp.

Figure 6:
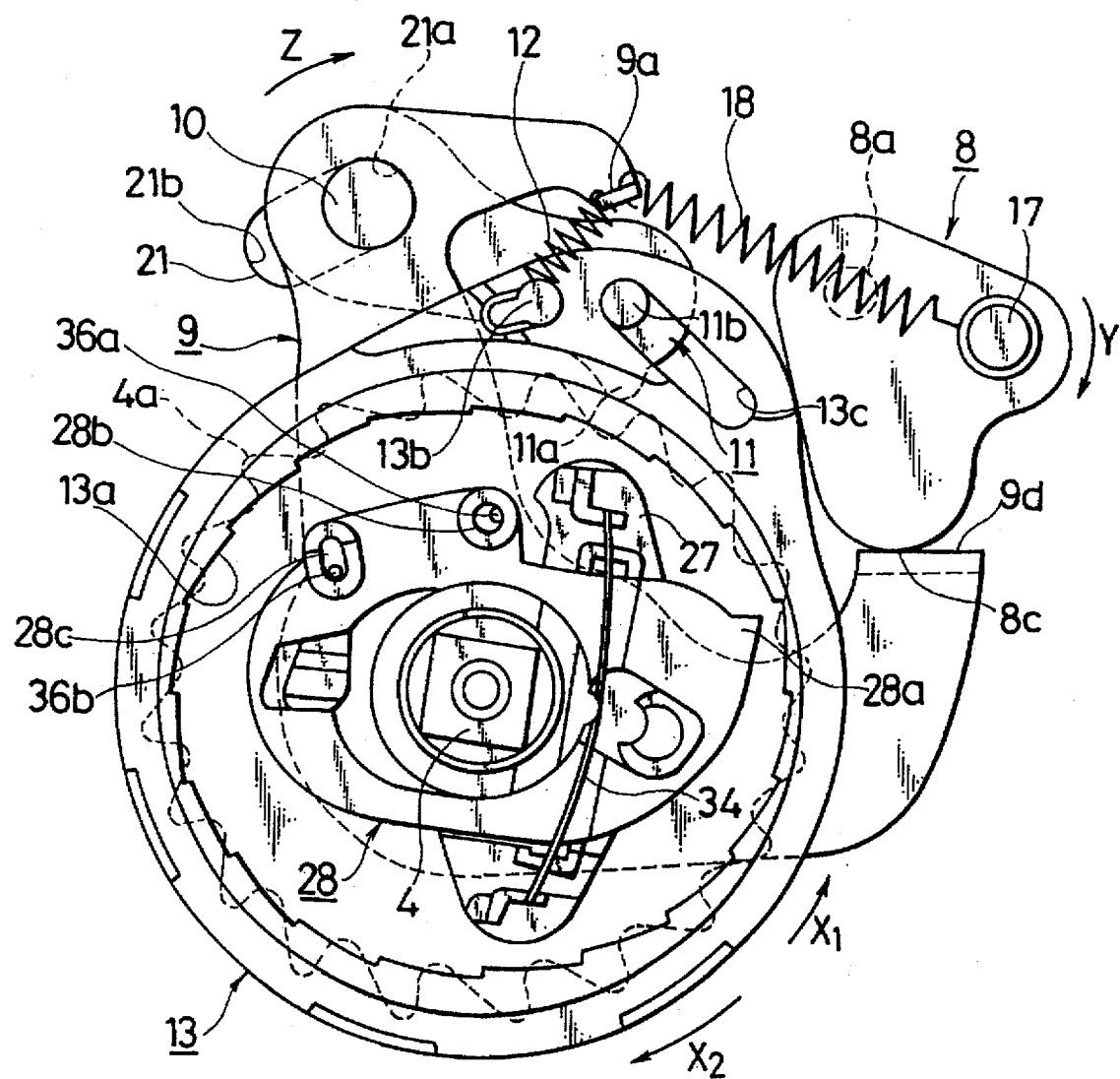
FIG. 6 is an enlarged fragmentary view of an emergency locking mechanism in the retractor depicted in FIG. 1, which is useful for the description of operation of the emergency locking mechanism.

First, during normal use, as shown in FIG. 3, the inner pin 8a of the outer plate cam 8, said inner pin 8a being in engagement with the engagement hole 7e of the clamp lever 7, is located on a side of a lower edge of the slot 22 by the biasing force of the return spring 15, and the clamp 6 is biased by the biasing force of the return spring 15 in a direction in which the clamp 6 remains out of engagement with the webbing 26. Further, as illustrated in FIG. 6, the latch cup 13 is biased in the direction of arrow $X_2$ by the biasing force of the return spring 12 which extends between the spring hanger 13b and the spring hanger 9a of the tension plate 9, and the pawl 11 with the pawl guide pin 11b maintained in engagement with the pawl guide slot 13c is biased in the direction in which the pawl 11 is maintained out of engagement with the latch plate 4a. Accordingly, the webbing can be wound out freely.

When a tension is applied to the webbing in the event of an emergency such as a collision and an impactive rotating force of at least the predetermined value is applied in the webbing releasing direction (the direction of arrow $X_1$ shown in FIG. 2) to the take-up spindle 4, the inertia member 37 is subjected to an inertia force so that with a lag in rotation relative to rotation of the take-up spindle 4 in the webbing releasing direction, the inertia member 37 begins to rotate in the direction of arrow $X_2$ relative to the take-up spindle 4. The engaging portion 28a of the lock member 28 is then brought into engagement with one of the internal teeth 13a of the latch cup 13. A rotating force of the flange 27 fixed on the take-up spindle 4 is accordingly transmitted to the latch cup 13, whereby the latch cup 13 is caused to turn in the direction of arrow $X_1$ against the biasing force of the return spring 12. Then, the pawl guide slot 13c maintained in engagement with the pawl guide pin 11b causes the pawl 11 to turn in the direction of arrow Z via the pawl guide pin 11b so that an engaging portion 11a is brought into engagement with the latch plate 4a.

When the take-up spindle 4 turns further in the direction of arrow $X_1$ with the engaging portion 11a of the pawl 11 maintained in engagement with the latch plate 4a, the pawl pin 10 with the pawl 11 pivotally supported thereon is caused to move from the rear edge 21a toward a front edge 21b in the slot 21 against the biasing force of the return spring 18 acting on the pawl pin 10 via the tension plate 9. The tension plate 9 is therefore caused to turn in the direction of arrow $X_1$. The engaged portion 9d of the tension plate 9 then causes the outer plate 8 to turn in the direction of arrow Y via the contacting portion 8c of the outer plate cam 8 so that the clamp lever 7 is also caused to turn in the direction of arrow Y (see FIG. 3) via the inner pin 8a inserted in the slot 22.

Figure 4:
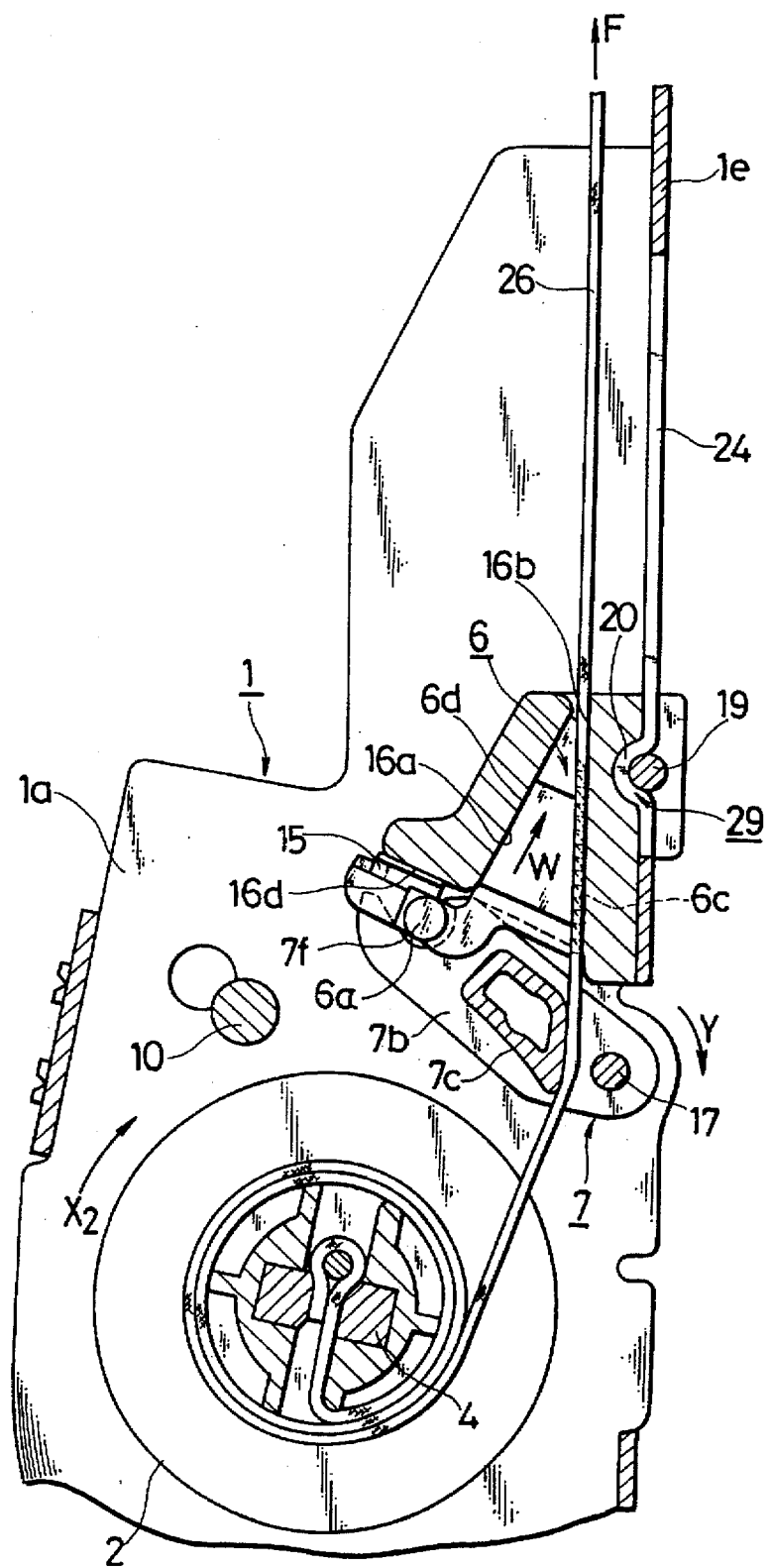
FIG. 4 is similar to FIG. 3 but illustrates the clamping mechanism in a different stage of the operation.

Then, the clamp 6 which is supported on the notched portions 7f formed on the sides of the free ends of the clamp lever 7 is immediately caused to move upwardly along the sliding contact surface 16a of the clamp movement limiting member 16. As the sliding contact surface 16a is inclined so that its upper side is located close to the pressure-receiving surface 16b, the wedge-shaped clamp 6 which is upwardly sliding against the biasing force of the return spring 15 moves in the webbing clamping direction (i.e., the direction of arrow W) so that, as is shown in FIG. 4, the clamp 6 penetrates between the sliding contact surface 16a and the pressure receiving surface 16b to clamp the webbing 26 between the toothed portion 6c of the clamp 6 and the pressure receiving surface 16c.

Here, normal resistance is produced between the clamp 6 and the clamp movement limiting member 16, so that a pressing force is applied to the clamp movement limiting member 16 to cause the clamp movement limiting member 16 to move in the webbing releasing direction along the rear wall 1e of the base 1. A force is therefore applied to the holding bent portions 20 of the plastically deformable portion 24, on which the clamp movement limiting member 16 is held, so that the clamp movement limiting member 16 can be caused to move toward an upper part of the retractor. The holding bent portions 20 have rigidity sufficient to remain undeformed if a pulling force applied to the webbing 26 is smaller than the predetermined value and a load applied plied to the holding bent portions 20 of the plastically deformable portion 24 via the clamp 6 and the clamp movement limiting member 16 is hence smaller than the predetermined load. When such a small pulling force is applied, the clamp movement limiting member 16 is limited in movement in the webbing releasing direction so that the webbing 26 is clamped between the clamp 6 and the pressure receiving surface 16b and is prevented from being pulled out.

Movement of the pawl pin 10 on which the pawl 11 is pivotally supported is stopped when the pawl pin 10 has been brought into contact with the front edge 21b of the slot 21 (see FIG. 6), whereby rotation of the take-up spindle 4 in the direction of arrow $X_1$ is prevented. The timing of this contact of the pawl pin 10 with the front edge 21b is set so that the contact takes place immediately after the toothed portion 6c of the clamp 6 has completely bitten the webbing 26. The operation timings of the clamp 6 and the pawl 11 can be changed as desired by modifying the shapes of the contacting portion 8c and the slot 21 as needed.

When the vehicle is subjected to a speed change of at least a predetermined value in the event of an emergency, the vehicle body acceleration sensing means 30 is also actuated so that the finger-shaped stopper 32a of the sensor arm 32 engages one of teeth 37a of the inertia member 37. As a consequence, the inertia member 37 is rendered to rotate with a lag relative to the take-up spindle. The clamping mechanism and the emergency locking mechanism are therefore actuated as described above.

Upon elimination of a tension applied to the webbing 26, a force under which the clamp 6 is biased in the clamping direction is also eliminated. By the biasing force of the return spring 15, the clamp 6 is therefore biased in a direction in which the clamp 6 remains out of engagement with the webbing 26. The clamping mechanism is therefore released and at the same time, the tension plate 9 turns in the releasing direction (i.e., the direction of arrow $X_2$) by the biasing force of the return spring 18, whereby the clamp 6 and the tension plate 9 return to their initial positions, respectively. Further winding of the webbing 26 causes the pawl to turn in a direction opposite to the direction of arrow Z so that the locking between the latch plate 4a and the engaging portion 11 is released. When the webbing 26 is wound in further, the engagement between the engaging portion 28a of the lock member 28 and one of the internal teeth 13a of the latch cup 13 is released so that the latch cup 13 is caused to turn in the direction of arrow $X_2$ to its initial position by the biasing force of the return spring 12 and the webbing 26 can hence be pulled out freely.

If the impactive force upon collision becomes excessively large and the pulling force F (see FIG. 4) to the webbing 26 becomes still greater in such a clamped state as described above, the clamp 6 is caused to move further in the direction of arrow W. The thrust (normal resistance) of the clamp 6 against the sliding surface 16 and the pressure receiving surface 16b therefore increases.

Described specifically, application of a pulling force F of at least the predetermined value to the webbing 26 results in application of a force of at least the predetermined load to the holding bent portions 20 of the plastically deformable portion 24 because the clamp 6 acts to cause movement of the clamp movement limiting member 16 toward the upper part of the retractor. As the clamp 6 moves in the webbing releasing direction, the clamp movement limiting member 16 progressively moves together with the clamp 6 in the webbing releasing direction while a lower wall portion of the guide slit 29 plastically deforms the plastically deformable portion 24 while squeezing the same.

Figure 5:
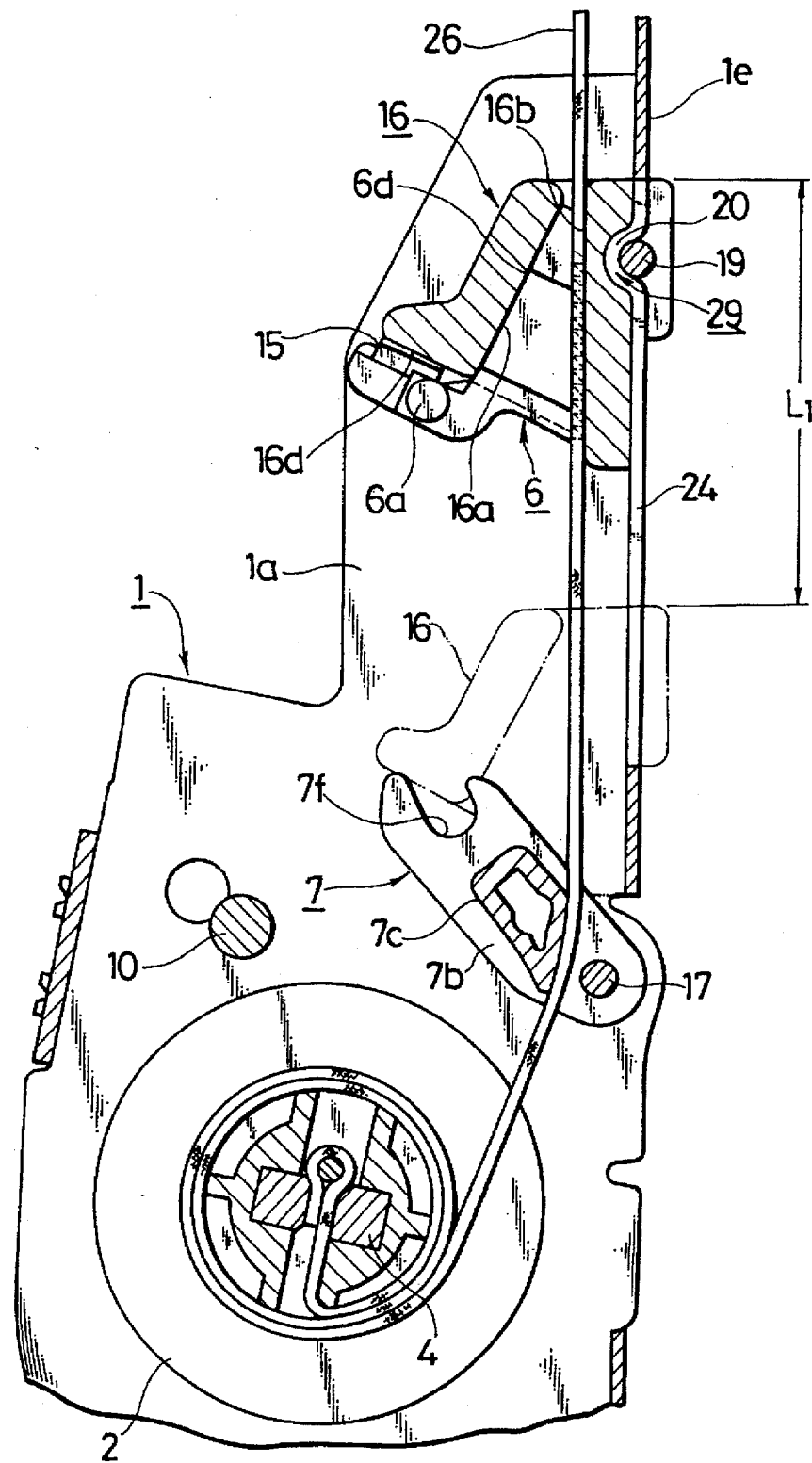
FIG. 5 is similar to FIGS. 3 and 4 but illustrates the clamping mechanism in a further different stage of the operation.

As a result of the movement of the clamp movement limiting member 16 together with the clamp 6 in the webbing releasing direction, the webbing 26 is allowed to extend out from the retractor. As is illustrated in FIG. 5, the clamp movement limiting member 16 therefore moves over a length $L_1$ in the webbing releasing direction while deforming the plastically deformable portion 24 which is limiting movement of the clamp movement limiting member 16. Concurrently with this movement, the webbing 26 wound on and around the bobbin 2 is tightened so that the webbing 26 extends out by a length $L_1$.

Accordingly, kinetic energy of the occupant is effectively consumed by deformation resistance of the plastically deformable portion 24 and tightening resistance of the webbing 26. It is also possible to avoid an abrupt reduction in a pulling force applied to the webbing 26 although such an abrupt reduction would occur upon declamping in the above-described conventional retractors. Accordingly, the webbing 26 is pulled out of the retractor at a constant pulling force.

It is therefore possible to improve the absorbability of kinetic energy of the occupant in an initial stage of the collision and also to suppress the re-increase in load after the reduction in load. An impact to the occupant can therefore be effectively reduced.

Figure 7:
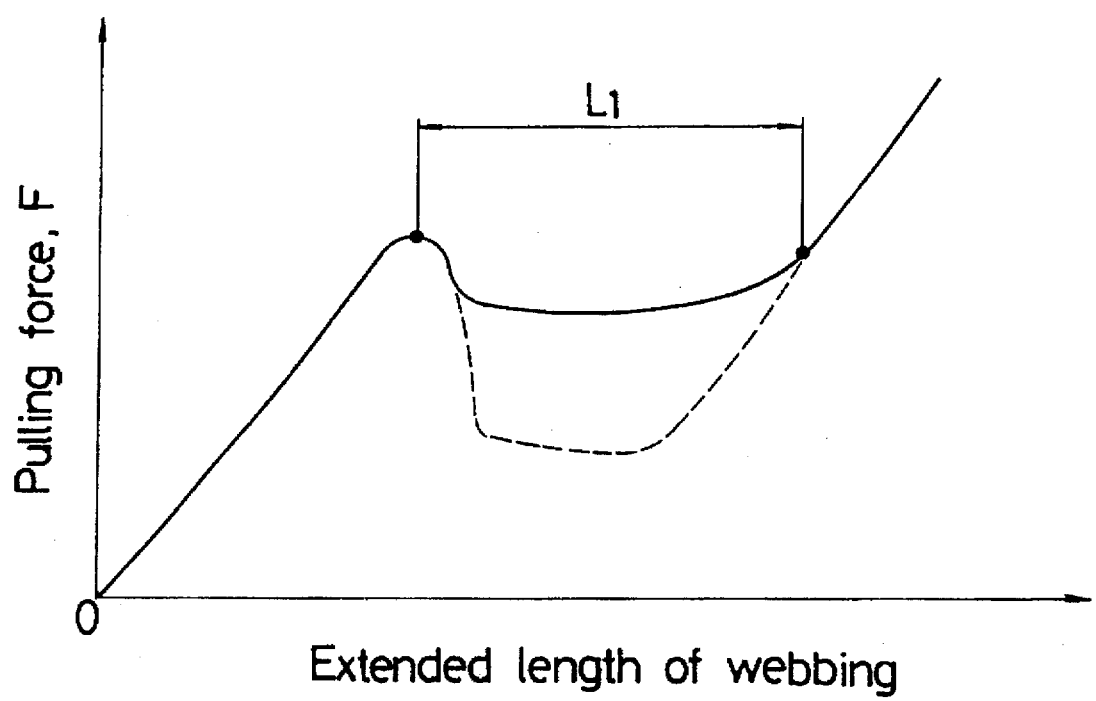
FIG. 7 is a diagram illustrating a relationship between an extended length of a webbing in the retractor according to the first embodiment of the present invention and a pulling force applied to the webbing.
Figure 8:
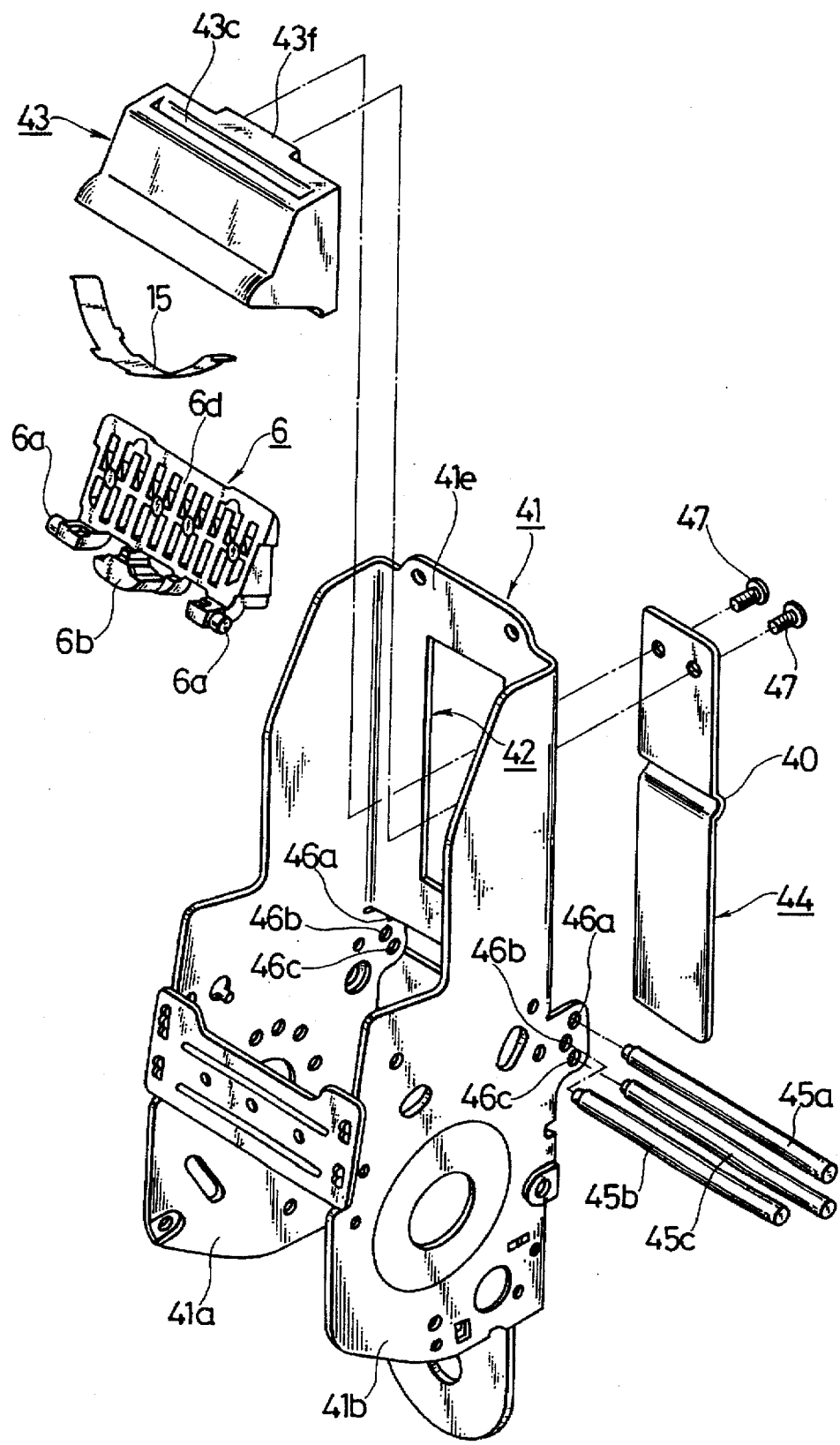
FIG. 8 is an exploded fragmentary perspective view of a retractor having a clamp, which retractor pertains to a second embodiment of the present invention.
Figure 9:
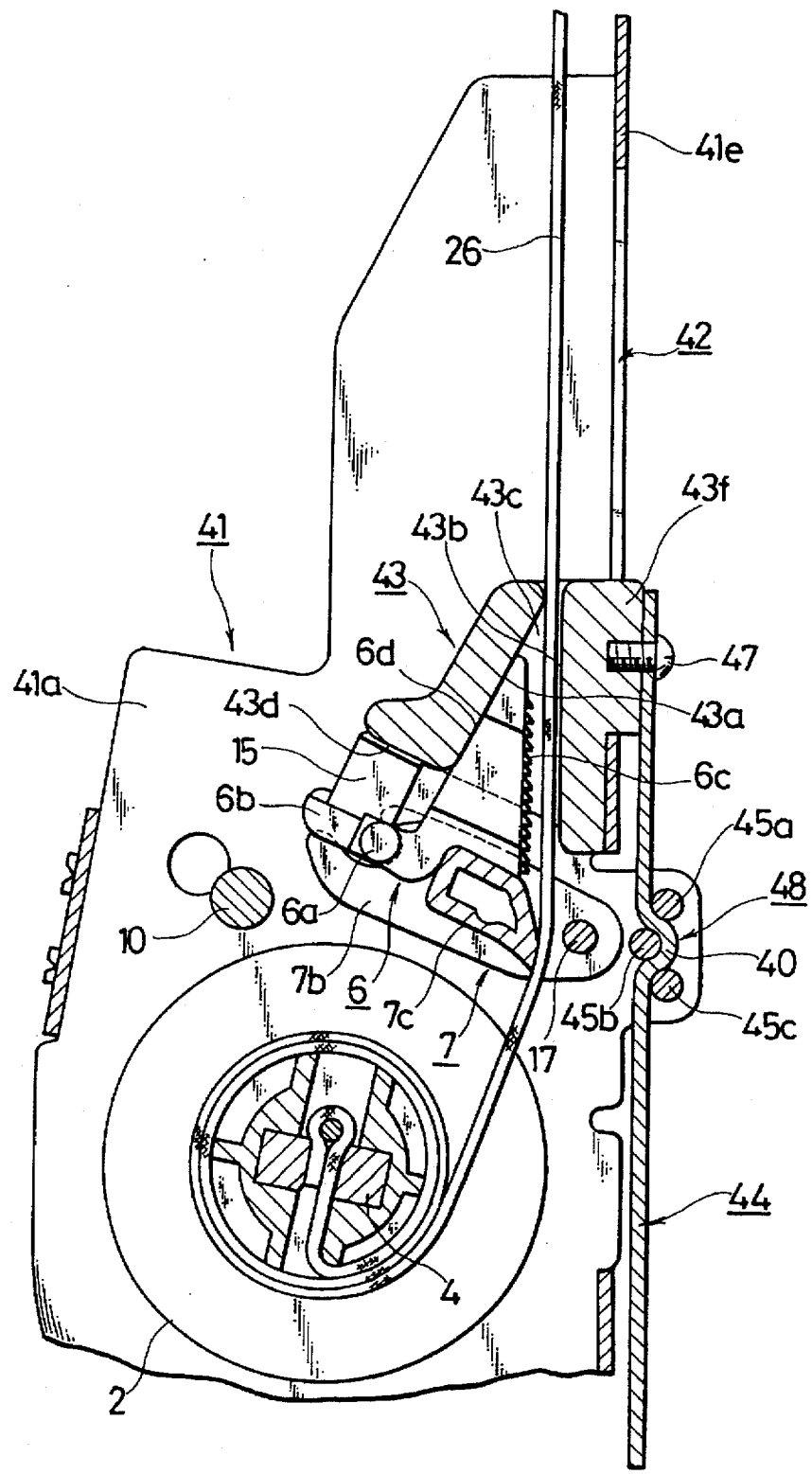
FIG. 9 is a fragmentary vertical cross-sectional view of a clamping mechanism in the retractor according to the second embodiment, which is useful for the description of operation of the clamping mechanism.
Figure 10:
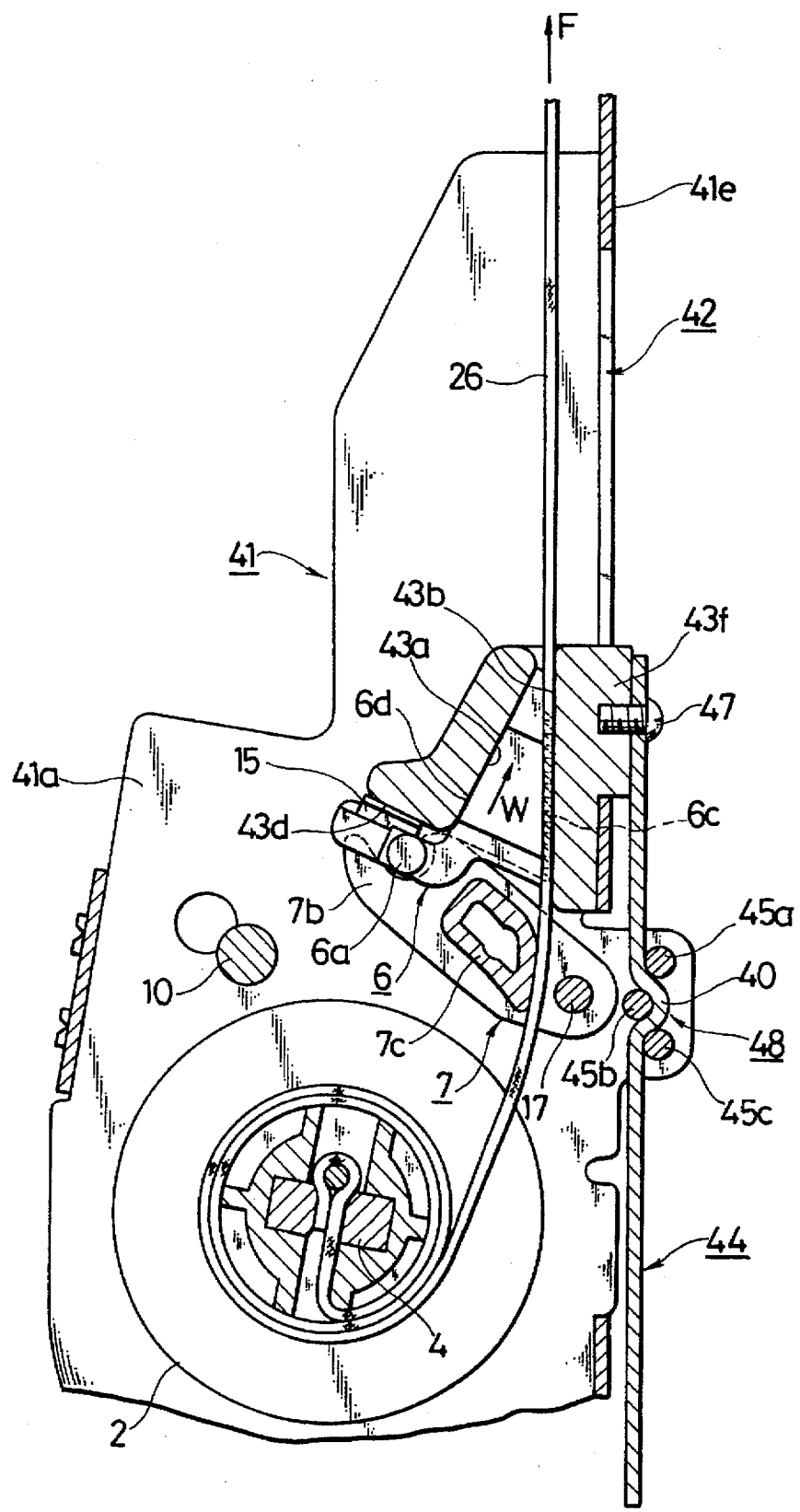
FIG. 10 is similar to FIG. 9 but illustrates the clamping mechanism in a different stage of the operation.

As is clearly envisaged from the diagram of FIG. 7 showing the relationship between the extended length of the webbing and the pulling force, a retractor having a conventional clamp which is indicated by a broken curve in the diagram causes tightening of a webbing wound on and around a take-up spindle concurrently with release of its clamping mechanism so that the webbing rapidly extends out. The webbing pulling force applied to the webbing therefore suddenly decreases once and, as a result of locking of rotation of the take-up spindle in the webbing releasing direction by an emergency locking mechanism, the webbing pulling force suddenly increases again. On the other hand, in the retractor according to this embodiment which is provided with the clamp and is indicated by a solid curve in the diagram, the webbing pulling force is prevented from abruptly decreasing so that a re-increase in load after the decrease in load is suppressed.

According to the retractor which has the clamp and pertains to the first embodiment, the plastically deformed portion 24 is plastically deformed while being squeezed and the clamp movement limiting member 16 moves together with the clamp 6 in the webbing releasing direction, whereby the clamping mechanism is released. It is therefore unnecessary to movably fix the main body of the retractor on the vehicle body. This makes it possible to firmly fix the base 1 of the retractor on the body panel and also improve its only-vehicle mountability.

FIGS. 8 through 11 are the exploded fragmentary perspective view and fragmentary vertical cross-sections of the retractor which has the clamp and pertains to the second embodiment of the present invention. With respect to members of structure similar to the corresponding members in the above-described first embodiment, their detailed description is omitted herein.

A clamping mechanism in the retractor, which has the clamp and pertains to the second embodiment of the present invention, comprises a clamp 6, a clamp movement limiting member 43, a plastically deformable member 44 and a guide slot 48. The clamp 6 is a wedge-shaped clamp member having a toothed portion 6c formed thereon for clamping engagement with a webbing 26. The clamp movement limiting member 43 defines therein a wedge-shaped opening 43c which can receive a tapered end portion of the clamp 6. The plastically deformable member 44 constitutes a holding mechanism for limiting the clamp movement limiting member 43 in movement in a webbing releasing direction.

The wedge-shaped opening 43c of the clamp movement limiting member 43, which is formed as an integral unit like the clamp movement limiting member 16 in the first embodiment, is formed by a sliding contact surface 43a, a pressure receiving surface 43b and opposite side surface located on opposite sides, respectively, as viewed in the direction of a width of the webbing. The sliding contact surface 43a undergoes a sliding contact with a flat surface 6d, which is on a side opposite to a webbing-facing surface of the clamp 6, so that the clamp 6 is guided to a webbing-clamping engagement position. The pressure-receiving surface 43b is pressed by the webbing-facing surface of the clamp 6 with the webbing 26 clamped therebetween. The sliding contact surface 43a is formed at a predetermined inclination so that the sliding contact surface 43a is located, on an upper side thereof, close to the pressure-receiving surface 43b parallel to a rear wall 41e of a base 41.

On the other hand, the rear wall 41e of the base 41 defines therein a guide opening 42 which extends in the direction of a length of the webbing. An engaging raised portion 43f arranged on a rear wall of the clamp movement limiting member 43 is in engagement with the guide opening 42 and the clamp movement limiting member 43 is arranged movably in parallel with the rear wall 41e of the base 41. Further, the plastically deformable member 44 formed of an elongated metal plate or the like is secured at an end portion thereof on the clamp movement limiting member 43 by self-tapping screws 47. Below the end portion, a holding bent portion 40 has been formed by bending the plastically deformable member 44 into a semicircular shape in cross-section so that the holding bent portion 40 extends out from the retractor.

The guide slit 48 having a cross-sectional shape complementary with the bent shape of the holding bent portion 40 is formed on a rear side of the base 41 at a position below the guide opening 42 by holding members which make up the holding mechanism. The guide slit 48 is formed by three pins 45a,45b,45c as holding members, which extend between through-holes 46a,4bb,46c formed in mutually opposing relationships in respective side walls 41a,41b of the base 41.

As the pins 45a,45b,45c extending between their corresponding through-holes 46a,46bb,46c hold the holding bent portion 40 between the pins 45a,45c and the pin 45b, the clamp movement limiting member 43 fixedly secured to the end portion of the plastically deformable member 44 is held on the retractor in such a state that the clamp movement limiting member 43 is limited in movement in the webbing releasing direction.

Operation of the clamping mechanism in the second embodiment will next be described.

First, when a tension is applied to the webbing 26 in the event of an emergency such as a collision and an impactive rotating force of at least a predetermined value is applied in a webbing releasing direction to the take-up spindle 4, the wedge-shaped clamp 6 is immediately caused to upwardly move by the clamp lever 7 along the sliding contact surface 43a of the clamp movement limiting member 43. The clamp 6 therefore moves in a webbing clamping direction (i.e., the direction of arrow W) and penetrates between the sliding contact surface 43a and the pressure receiving surface 43b, whereby the webbing 26 is clamped between the toothed portion 6c and the pressure receiving surface 43b.

When the pulling force F to the webbing 26 becomes still greater in such a clamped state as described above, the clamp 6, together with the clamp movement limiting member 43, makes the plastically deformable member 44 move toward an upper part of the retractor so that a force acting on the holding bent portion 40 also becomes a load of at least the predetermined value. As the clamp 6 moves in the webbing releasing direction, the clamp movement limiting member 43 therefore moves together with the clamp 6 in the webbing releasing direction with the plastically deformable member 44 being plastically deformed by the pins 45a,45b, 45c, which define the guide slit 48, while squeezing the plastically deformable member 44.

Figure 11:
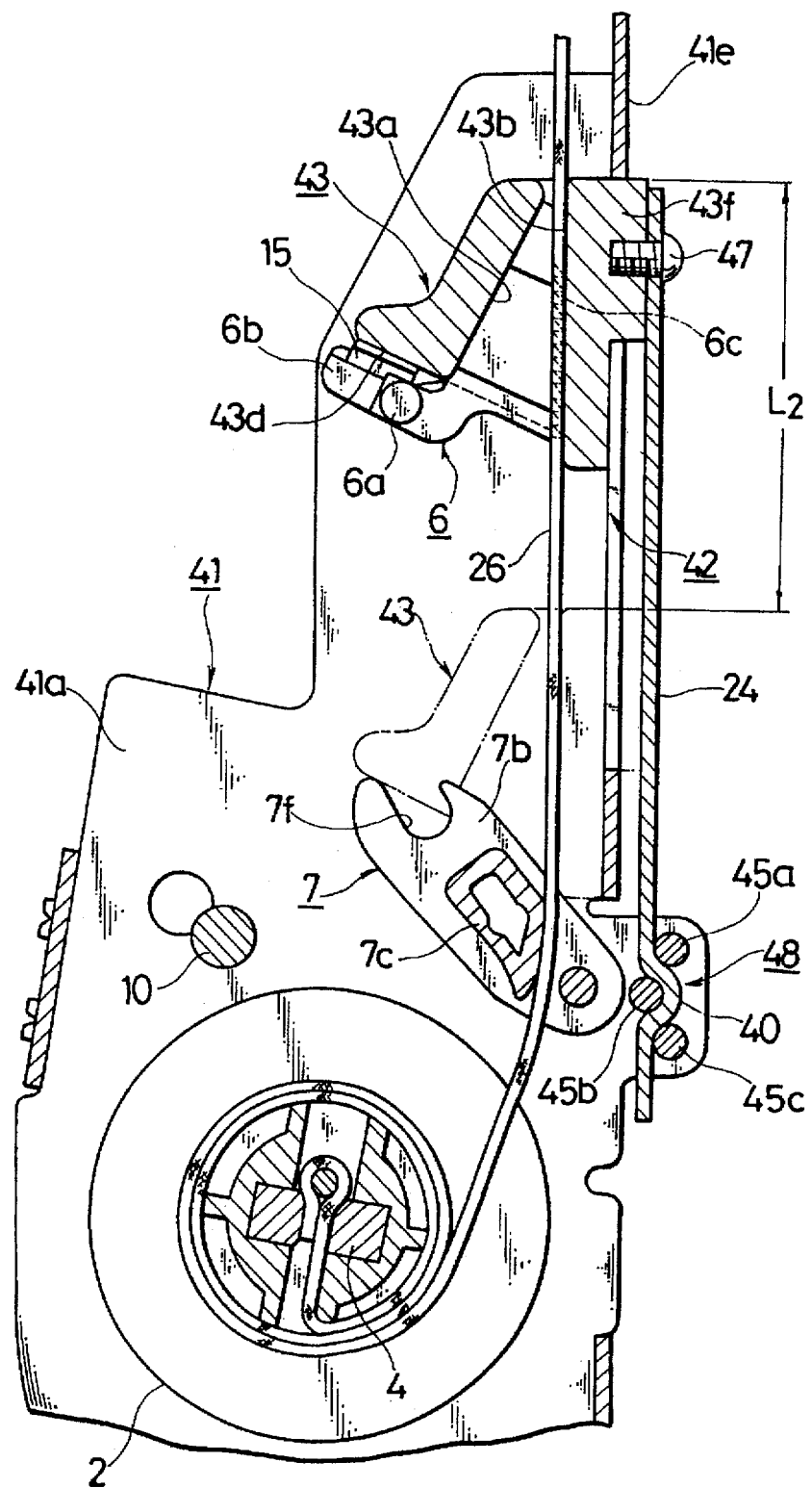
FIG. 11 is similar to FIGS. 9 and 10 but illustrates the clamping mechanism in a further different stage of the operation.

As is shown in FIG. 11, the clamp movement limiting member 43 then moves over a distance $L_2$ in the webbing releasing direction while deforming the plastically deformable member 44 which has limited movement of the clamp movement limiting member 43 until then. At the same time, the webbing 26 wound on and around the bobbin 2 is tightened so that the webbing 26 extends out by a length $L_2$.

Accordingly, kinetic energy of the occupant is effectively consumed by deformation resistance of the plastically deformable portion 44 and tightening resistance of the webbing 26. It is therefore possible to avoid an abrupt reduction in a pulling force so that the webbing 26 is pulled out of the retractor at a constant pulling force.

Obviously, the shapes and constructions of the plastically deformable member and the holding members in the present invention are not limited to the above-described embodiments but various modifications are possible.

For example, the pulling force on the webbing which is required to move the clamping member as described above can be set as desired by changing the shape of the guide slit or the rigidity of the plastically deformable portion. Similarly, the extendible length of the webbing can be easily set at a desired value.

Further, the present invention is not limited to the constructions of such emergency locking mechanisms as those of the above-described embodiments, but can also be applied to retractors having a clamp and an emergency locking mechanism provided with other inertia sensing means and locking means.

What is claimed:

1. A retractor having a clamp, comprising:
    a base,
    a take-up spindle rotatably supported on said base,
    a webbing wound on said take-up spindle,
    a clamp movement limiting member,
    a holding mechanism for holding said clamp movement limiting member on a base via a plastically deformable member, said holding mechanism clampingly engaging in said plastically deformable member
    said clamp movable between a first position where said clamp holds said webbing between itself and said clamp movement limiting member and a second position wherein said clamp permits free passing of said webbing,
    a transmitting member for bringing said clamp from said second position to said first position in response to rotation of said take-up spindle in a webbing releasing direction, and
    a connecting member for releasably connecting said transmitting member to said take-up spindle;
    wherein when said clamp is brought to said first position by said transmitting member and a pulling force of at least a predetermined value is then applied to said webbing, said plastically deformable member undergoes deformation while maintaining a webbing clamping force, thereby permitting movement of said clamp movement limiting member in said webbing releasing direction.

2. A retractor according to claim 1, wherein said holding mechanism comprises said plastically deformable member, which is arranged on one of said base and said clamp movement limiting member, and a holding member arranged on the other one of said base and said clamp movement limiting member and holding said plastically deformable member.

3. A retractor according to claim 2, wherein said plastically deformable member comprises a bent portion of a predetermined shape, and said holding member holds said bent portion.

4. A retractor according to claim 3, wherein said plastically deformable member is an elongated member attached to said clamp movement limiting member and said base has a holding member maintained in engagement with said bent portion.

5. A retractor according to claim 1, wherein said clamp is in the form of a wedge whose thickness decreases in the releasing direction of said webbing; and said clamp movement limiting member has a sliding contact surface maintained in sliding contact with one of surfaces of said wedge of said clamp to guide said clamp to said first position and a pressure receiving surface facing the other face for holding said webbing between itself and said other surface.

6. A retractor according to claim 1, wherein said holding mechanism engages opposing sides of said plastically deformable member.

7. A retractor according to claim 1, wherein said deformation of the plastically deformable member is effected by a frictional engagement with said holding mechanism.

8. A retractor according to claim 1, wherein said deformation of the plastically deformable member is effected by a relative movement between said holding mechanism and said plastically deformable member.

9. A retractor having a clamp, comprising:
    a base
    a take-up spindle rotatably supported on said base,
    a webbing wound on said take-up spindle,
    a clamp movement limiting member,
    a holding mechanism for holding said clamp movement limiting member on a base via a plastically deformable member,
    said clamp movable between a first position where said clamp holds said webbing between itself and said clamp movement limiting member and a second position wherein said clamp permits free passing of said webbing
    a transmitting member for bringing said clamp from said second position to said first position in response to rotation of said take-up spindle in a webbing releasing direction and
    a connecting member for releasably connecting said transmitting member to said take-up spindle;

wherein when said clamp is brought to said first position by said transmitting member and a pulling force of at least a predetermined value is then applied to said webbing, said plastically deformable member undergoes deformation while maintaining a webbing clamp in force thereby permitting movement of said clamp movement limiting member in said webbing releasing direction, wherein said holding mechanism comprises a bent portion of a predetermined shape of said plastically deformable member, which is a part of said base, and a holding member arranged on said clamp movement limiting member, said holding member of having a complementary shape with and holding said bent portion.

10. A retractor according to claim 9, wherein said bent portion of said plastically deformable member is bent in a substantially semicircular shape in cross-section, and said clamp movement limiting member comprises a groove of a complementary shape with said bent portion and a pin arranged on a concave side of said bent portion.

11. A retractor having a clamp, comprising:

a base;

a take-up spindle rotatably supported on said base, a webbing wound on said take-up spindle, a clamp movement limiting member, a holding mechanism for holding said clamp movement limiting member on a base via a plastically deformable member, said clamp movable between a first position where said clamp holds said webbing between itself and said clamp movement limiting member and a second position wherein said clamp permits free passing of said webbing, a transmitting member for bringing said clamp from said second position to said first position in response to rotation of said take-up spindle in a webbing releasing direction and a connecting member for releasably connecting said transmitting member to said take-up spindle;

wherein when said clamp is brought to said first position by said transmitting member and a pulling force of at least a predetermined value is then applied to said webbing, said plastically deformable member undergoes deformation while maintaining a webbing clamp force, thereby permitting movement of said clamp movement limiting member in said webbing releasing direction, wherein said plastically deformable member is an elongated member attached to said clamp movement limiting member and comprises a bent portion of a predetermined shape and said base has a holding member maintained in engagement with said bent portion, and wherein said holding member comprises a first pin arranged in a convex portion of said bent portion and a second and third pins located on a convex side of said bent portion and arranged on opposite sides of said first pin relative to a longitudinal direction of said plastically deformable member.

12. A retractor having a clamp, comprising:

a base, a take-up spindle rotatably supported on said base, a webbing wound on said take-up spindle, a clamp movement limiting member, a holding mechanism for holding said clamp movement limiting member on a base via a plastically deformable member, said clamp movable between a first position where said clamp holds said webbing between itself and said clamp movement limiting member and a second position wherein said clamp permits free passing of said webbing, a transmitting member for bringing said clamp from said second position to said first position in response to rotation of said take-up spindle in a webbing releasing direction, and a connecting member for releasably connecting said transmitting member to said take-up spindle;

wherein when said clamp is brought to said first position by said transmitting member and a pulling force of at least a predetermined value is then applied to said webbing, said plastically deformable member is deformed by a frictional engagement with said holding mechanism while maintaining a webbing clamping force, thereby permitting movement of said clamp movement limiting member in said webbing releasing direction.

13. A retractor according to claim 12, wherein said plastically deformable member is deformed by a relative movement between said holding mechanism and said plastically deformable member.

14. A retractor according to claim 13, wherein said holding mechanism clampingly engages said plastically deformable member.

15. A retractor according to claim 12, wherein said holding mechanism engages opposing sides of said plastically deformable member.

16. A retractor according to claim 14, wherein said holding mechanism engages opposing sides of said plastically deformable member.

* * * * *